(12) United States Patent
Machida et al.

(10) Patent No.: US 8,170,394 B2
(45) Date of Patent: May 1, 2012

(54) MULTIMEDIA PLAYER DISPLAYING OPERATION PANEL DEPENDING ON CONTENTS

(75) Inventors: Yoshihiro Machida, Yokohama (JP);
Nobuhiro Tsutsumi, Yokohama (JP);
Kouji Kamogawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1442 days.

(21) Appl. No.: 11/508,209

(22) Filed: Aug. 23, 2006

(65) Prior Publication Data
US 2007/0047920 A1 Mar. 1, 2007

(30) Foreign Application Priority Data
Aug. 30, 2005 (JP) ................................. 2005-248576

(51) Int. Cl.
*H04N 9/80* (2006.01)
(52) U.S. Cl. ...................................... 386/230; 386/240
(58) Field of Classification Search .................... 386/46, 386/83, 95, 124–126, 230, 343, 231, 248, 386/240; 725/37, 61
See application file for complete search history.

(56) References Cited

U.S. PATENT DOCUMENTS

| | | | | |
|---|---|---|---|---|
| 4,746,919 A * | 5/1988 | Reitmeier | ............... | 340/825.56 |
| 4,825,209 A * | 4/1989 | Sasaki et al. | ............. | 340/825.72 |
| 5,315,999 A * | 5/1994 | Kinicki et al. | ................ | 600/443 |
| 5,416,535 A * | 5/1995 | Sato et al. | ...................... | 348/706 |
| 6,297,856 B1 * | 10/2001 | Nakamura et al. | ............ | 348/705 |
| 7,071,865 B2 * | 7/2006 | Shibamiya et al. | ........... | 341/176 |
| 7,126,587 B2 * | 10/2006 | Kawakami et al. | ........... | 345/168 |
| 7,174,518 B2 * | 2/2007 | Kim | ............................. | 715/764 |
| 7,595,846 B2 * | 9/2009 | Moon | ............................. | 348/734 |
| 7,917,933 B2 * | 3/2011 | Thomas et al. | .................. | 725/88 |
| 2003/0050885 A1 * | 3/2003 | Cohen et al. | .................... | 705/37 |
| 2004/0131335 A1 * | 7/2004 | Halgas et al. | ................... | 386/83 |
| 2005/0053356 A1 * | 3/2005 | Mate et al. | ....................... | 386/52 |
| 2005/0097600 A1 * | 5/2005 | Heer | ............................... | 725/37 |
| 2005/0188408 A1 * | 8/2005 | Wallis et al. | .................... | 725/87 |
| 2005/0262535 A1 * | 11/2005 | Uchida et al. | ................... | 725/80 |
| 2006/0271971 A1 * | 11/2006 | Drazin | ............................ | 725/86 |
| 2007/0003220 A1 * | 1/2007 | Hamasaka et al. | .............. | 386/95 |
| 2007/0106945 A1 * | 5/2007 | Kim | ............................. | 715/740 |
| 2008/0184297 A1 * | 7/2008 | Ellis et al. | ........................ | 725/39 |

FOREIGN PATENT DOCUMENTS
EP     1376321     *    1/2004
(Continued)

OTHER PUBLICATIONS
Machine generated translation of JP 2005-006144 to Suda et al., Jun. 2005.*

*Primary Examiner* — David Harvey
(74) *Attorney, Agent, or Firm* — Antonelli, Terry, Stout & Kraus, LLP.

(57) ABSTRACT

A digital content reproducing apparatus is provided with a plurality of user operation interfaces, e.g., a linear content operation panel and an interactive content operation panel, a data monitor unit monitors information on digital contents, and upon occurrence of a change, the plurality of user operation panels are automatically and exclusively displayed in an operation panel display area. Accordingly, only usable operation keys can be displayed, user operation learning time can be shortened, since the panel rendering area is made small, a mouse motion distance can be shortened, and easy to use can be improved. Further, since the panel rendering area is made small, the image display area can be made relatively large.

9 Claims, 11 Drawing Sheets

FOREIGN PATENT DOCUMENTS

| | | | |
|---|---|---|---|
| JP | 08079647 A | * | 3/1996 |
| JP | 09-168131 | | 6/1997 |
| JP | 11-298822 | * | 10/1999 |
| JP | 2000-287159 | * | 10/2000 |
| JP | 2005-006144 | | 1/2005 |
| JP | 2005-073022 | | 3/2005 |
| WO | WO 98/44732 | * | 10/1998 |
| WO | WO 2005/024828 | * | 3/2005 |

* cited by examiner

LINEAR CONTENT OPERATION PANEL

INTERACTIVE CONTENT OPERATION PANEL

FIG.13

| ITEM | CONTENTS |
|---|---|
| RECORD TIME DAY | 2005/7/7 |
| INFORMATION ON CONTENTS OF DATA BROADCAST | NEWS |
| APPRECIATION TERM | 2005/7/14 |
| VIEW HISTORY (IMAGE) | 80 % DONE |
| VIEW HISTORY (DATA BROADCAST) | NONE |

MULTIMEDIA PLAYER DISPLAYING OPERATION PANEL DEPENDING ON CONTENTS

CROSS-REFERENCE TO RELATED APPLICATION

This application relates to and claims priority from Japanese Patent Application No. 2005-248576, filed on Aug. 30, 2005, the entire disclosure of which is incorporated herein by reference.

BACKGROUND OF THE INVENTION

The present invention relates to image rendering techniques for an apparatus which reproduces digital contents multiplexing a plurality of contents having different information, and more particularly to image rendering techniques for reproduction control of digital contents by using user operation interfaces.

A conventional digital broadcasting compatible HDD/DVD decoder which is a digital content reproduction apparatus requires, in addition to channel tuning, reproduction control keys for linear contents such as video and audio, the keys including "reproduce", "stop", "fast forward", "fast backward", "temporary stop" and other operation keys. The apparatus further requires "up", "down", "right", "left", "decide" and four-color keys for operation control of data broadcasting. In order to deal with all functions, a number of remote keys are required. It takes learning time in order for a user master an operation method, or there is an issue of not easy to use.

As described in JP-A-2005-73022, there is known a broadcast receiving apparatus which provides a user with illumination of a usable key of a remote controller in accordance with information on digital contents. Typical apparatus which perform reproduction control by graphical user interface (GUI) digital include a digital broadcasting compatible personal computer and a DVD reproduction compatible personal computer. In these apparatus, reproduction keys for linear contents and interactive contents are displayed on a screen and unusable keys are disabled so that it is possible to improve user easy to use performance. However, in order to display all keys, a large panel rendering area is required. Since linear contents and interactive contents are multiplexed and transmitted for digital broadcasting, these contents are also recorded in a multiplexed state.

SUMMARY OF THE INVENTION

The apparatus described in JP-A-2005-73022 is required to mount all keys so that a remote controller having a large area is used. Similarly, the apparatus using GUI is also required to display all keys so that a wide operation panel rendering area is used.

Information on data added digital broadcasting includes up-to-date news, weather forecast and the like. There arises an issue of a lapse of an appreciation term, when reproduction is made.

It is therefore an object of the present invention to display automatically only usable operation keys in accordance with information on digital contents. Accordingly, a user operation learning time can be shortened, since the panel rendering area is made small, a mouse motion distance can be shortened, and an easy to use performance can be improved. It is an object of the present invention to provide a digital content reproduction apparatus capable of having a relatively large image display area by making small a panel rendering area. It is another object of the present invention to provide a digital content reproduction apparatus capable of reproduction within an appreciation term by monitoring information on digital contents.

According to the digital content reproduction apparatus of the present invention, a plurality of user operation interfaces of the same size are provided, information on digital contents is monitored, and upon occurrence of a change in the information, the user operation interfaces are automatically and exclusively displayed in the same panel rendering area so that only usable operation keys can be displayed. Information on digital contents is monitored and display is controlled in accordance with digital content attributes.

According to the present invention, a plurality of user operation interfaces of the same size are provided, information on digital contents is monitored, and upon occurrence of a change in the information, the user operation interfaces are automatically and exclusively displayed in the same panel rendering area so that only usable operation keys can be displayed and a user operation learning time can be shortened.

According to the present invention, since the panel rendering area is made small, a mouse motion distance can be shortened so that a user easy to use performance can be improved.

According to the present invention, since the panel rendering area is made small, the image display area can be made relatively large.

According to the present invention, only information within an appreciation term can be presented by controlling the display state in accordance with information on digital contents.

Other objects, features and advantages of the invention will become apparent from the following description of the embodiments of the invention taken in conjunction with the accompanying drawings.

BRIEF DESCRIPTION OF THE DRAWINGS

FIG. 13 is an illustrative diagram showing digital content attributes according to another embodiment of the present invention.

DESCRIPTION OF THE EMBODIMENTS

Embodiments of the present invention will be described in detail with reference to the accompanying drawings.

Figure 1:
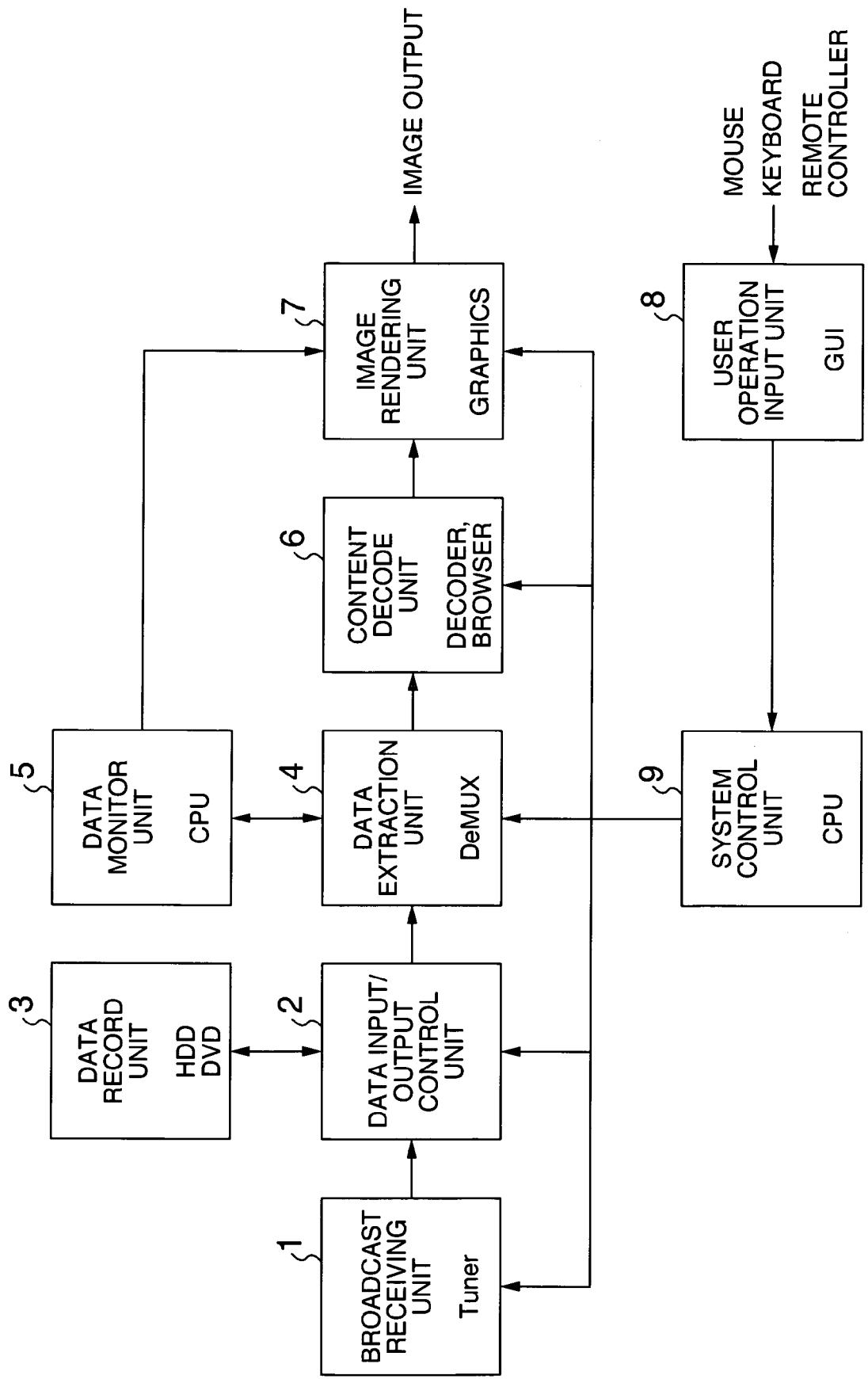
FIG. 1 is a diagram showing the structure of a digital content reproduction apparatus according to an embodiment of the present invention.

FIG. 1 is a diagram showing the structure of a digital content reproduction apparatus according to the embodiment of the present invention.

Referring to FIG. 1, the digital content reproduction apparatus records broadcast data received at a broadcast receiving unit 1 in a data record unit 3 with involvement of a data input/output control unit 2. The data input/output control unit 2 reads data from the data record unit 3 and supplies the read data via a data extraction (demultiplex) unit 4 to a content decode unit 6 which decodes the supplied data and sends the decoded data to an image rendering unit 7. A data monitor unit 5 always monitors information on digital contents in the data extraction unit 4, and in accordance with a change in the information, instructs the image rendering unit 7 to perform rendering of an user operation interface corresponding to the information on the contents. The decoded contents and the user operation interface are superposed and output as image data by the image rendering unit 7. A user input to the displayed user operation interface from a mouse, a keyboard or a remote controller is sent to a user operation input unit 8 which transfers the user operation information to a system control unit 9. In accordance with the user operation information, the system control unit 9 controls the broadcast receiving unit 1, data input/output control unit 2, data extraction unit 4, content decode unit 6 and image rendering unit 7.

Next, description will be made on the user operation interface during digital broadcast reproduction.

Figure 2:
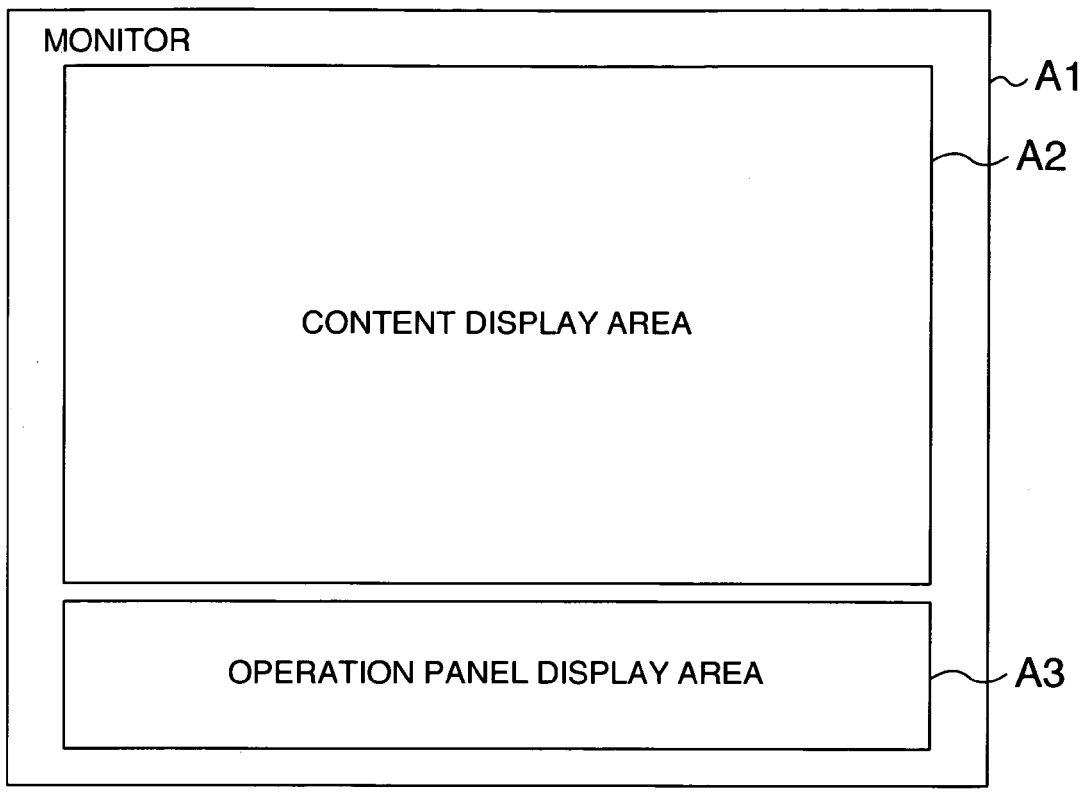
FIG. 2 is an illustrative diagram showing the layout of a screen of the apparatus shown in FIG. 1.
Figure 3:
FIG. 3 is an illustrative diagram showing a linear content operation panel of the apparatus shown in FIG. 1.
Figure 4:
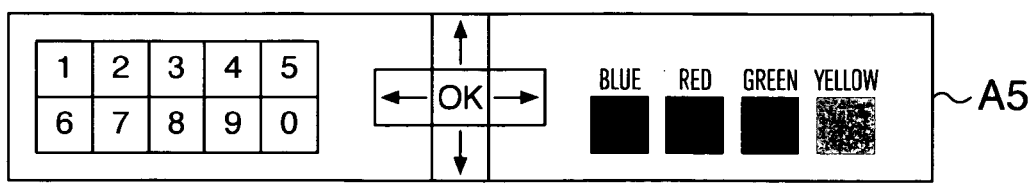
FIG. 4 is an illustrative diagram showing an interactive content operation panel of the apparatus shown in FIG. 1.

FIGS. 2 to 4 show image display states during digital broadcast reproduction. A monitor A1 has a content display area A2 and an operation panel display area A3. During reproduction of linear contents such as moving image contents, a linear content operation panel A4 is displayed in the operation panel display area A3, the linear content operation panel providing functions of reproduce, stop, temporary stop, fast forward, fast backward, previous skip, next skip and the like.

During reproduction of interactive contents such as data broadcast contents, an interactive content operation panel A5 is displayed in the operation panel display area A3, the interactive content operation panel providing functions of numerical keys from 0 to 9, up/down/right/left keys, a decide key, blue/red/green/yellow keys and other keys.

The linear content operation panel A4 and interactive content operation panel A5 are displayed exclusively and are not displayed at the same time. The functions provided by the linear content operation panel A4 and interactive content operation panel A5 are not limited to those described above, but the functions may be increased or decreased in accordance with the apparatus function.

Next, by taking Japanese terrestrial digital broadcasting as an example, description will be made on a specific digital content monitoring method.

TV type services, data broadcasting services and data added TV services are defined for Japanese terrestrial digital broadcasting (Association of Radio Industries and Businesses: Terrestrial Digital Television Broadcasting Operational Guideline TR-B14). Program specific information (PSI) on digital broadcasting contains a program map table (PMT). PMT contains a data encode descriptor which contains an auto_start_flag.

In data added TV services, if the auto_start_flag is "1", data broadcasting is automatically displayed, whereas if it is "0", data broadcasting is displayed upon instruction from a user. The data monitor unit monitors the auto_start_flag, and when the flag becomes "1", the interactive content operation panel A5 is displayed, and when the flat becomes "0", the linear content operation panel A4 is displayed.

In this embodiment, the linear content operation panel and interactive content operation panel are provided, information on digital contents is monitored, and upon occurrence of a change in the information, the panels are automatically and exclusively displayed in the operation panel display area A3 of the same panel rendering area size. Accordingly, only usable operation keys can be displayed, a user operation learning time can be shortened, since the panel rendering area is made small, a mouse motion distance can be shortened, and an easy to use performance can be improved. Further, since the panel rendering area is made small, the image display area can be made relatively large.

In this embodiment, although terrestrial digital broadcasting has been described, the embodiment is also used for reproduction of other digital contents. Also in this case, the operation panel can be switched automatically by monitoring the content switching flag.

Figure 5:
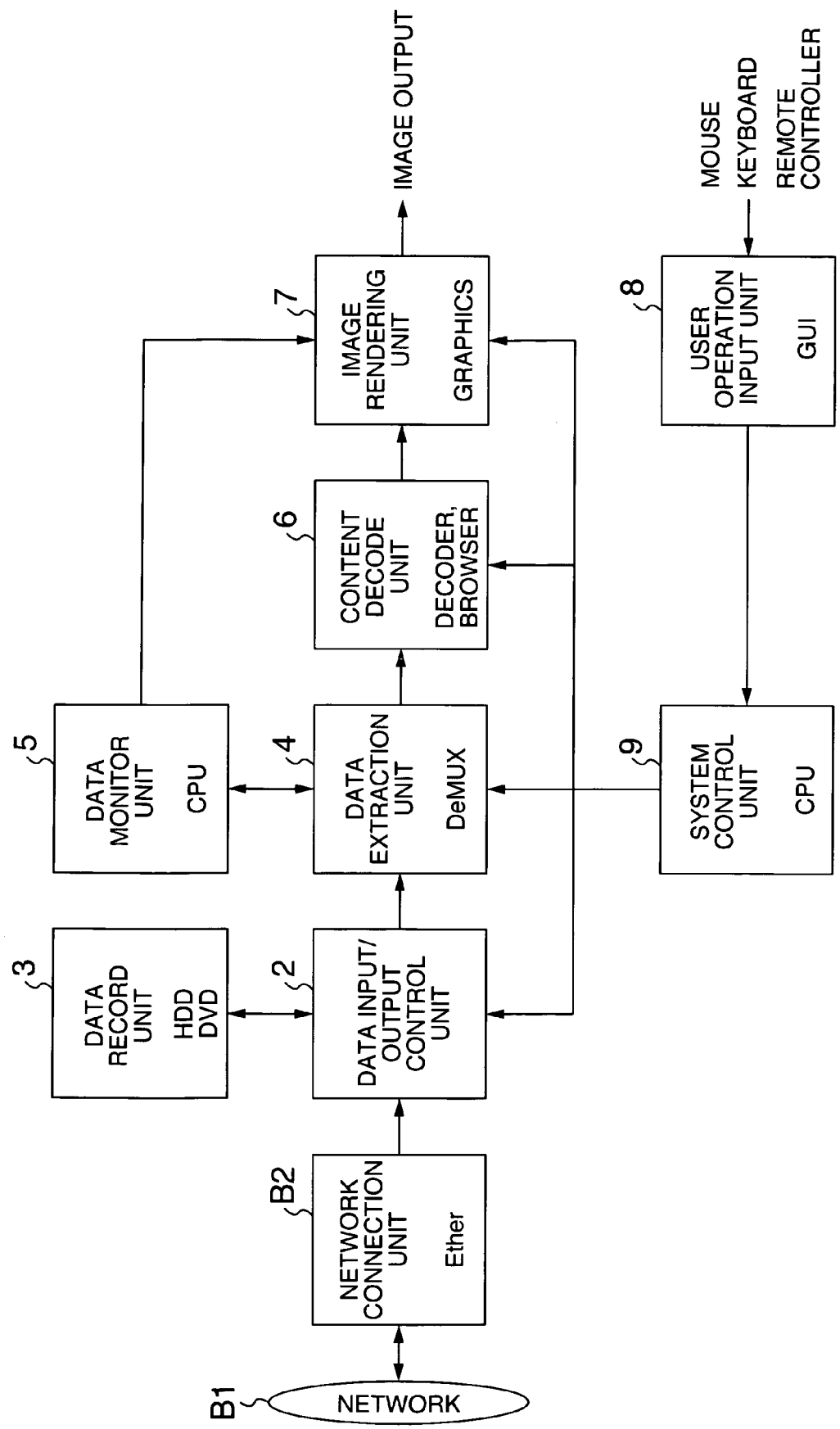
FIG. 5 is a diagram showing the structure of a digital content reproduction apparatus according to another embodiment of the present invention.

FIG. 5 is a diagram showing the structure of a digital content reproduction apparatus according to another embodiment of the present invention. Description will be made on only different points from the description described so far.

In the above description, although data is supplied to the apparatus by using broadcasting waves, in this embodiment, digital content services via a network B1 are assumed. In this case, data can be acquired via a network connection unit B2 connected to the network B1. The data input/output control unit 2 and other succeeding units are similar to those described above, and the description thereof is omitted.

Figure 6:
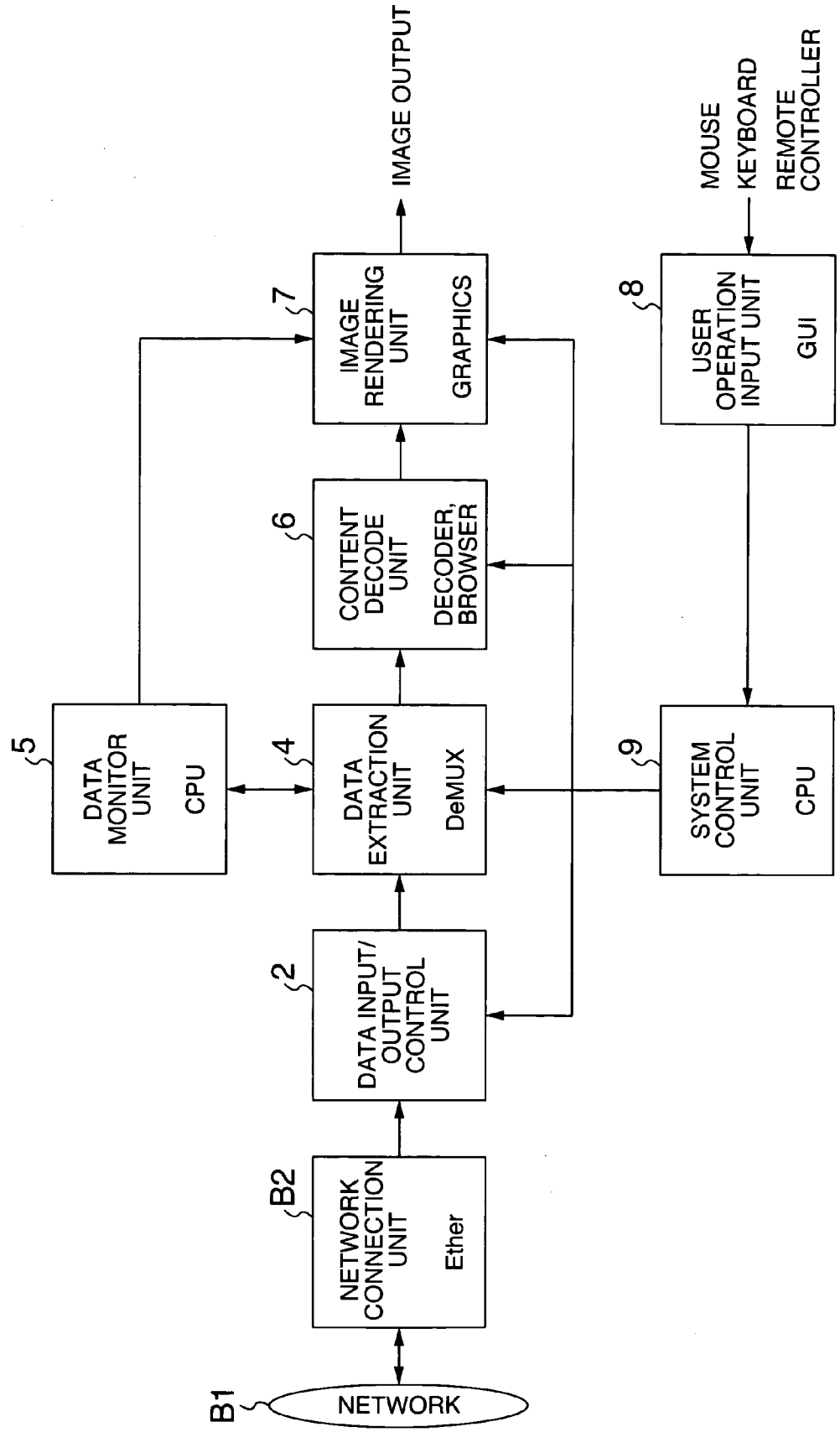
FIG. 6 is a diagram showing the structure of a digital content reproduction apparatus according to another embodiment of the present invention.

FIG. 6 is a diagram showing the structure of a digital content reproduction apparatus according to another embodiment of the present invention. Description will be made on only different points from the foregoing description.

In the foregoing description, although data acquired by the network connection unit B2 connected to the network B1 is recorded in the data record unit 3, in this embodiment, video on demand (VOD) type services are assumed and a data record unit is not provided in the reproduction apparatus. The data input/output unit 2 requests a VOD service center about necessary data via the network connection unit B2 and network B1. The data input/output control unit 2 and other succeeding units are similar to those described above, and the description thereof is omitted.

Figure 7:
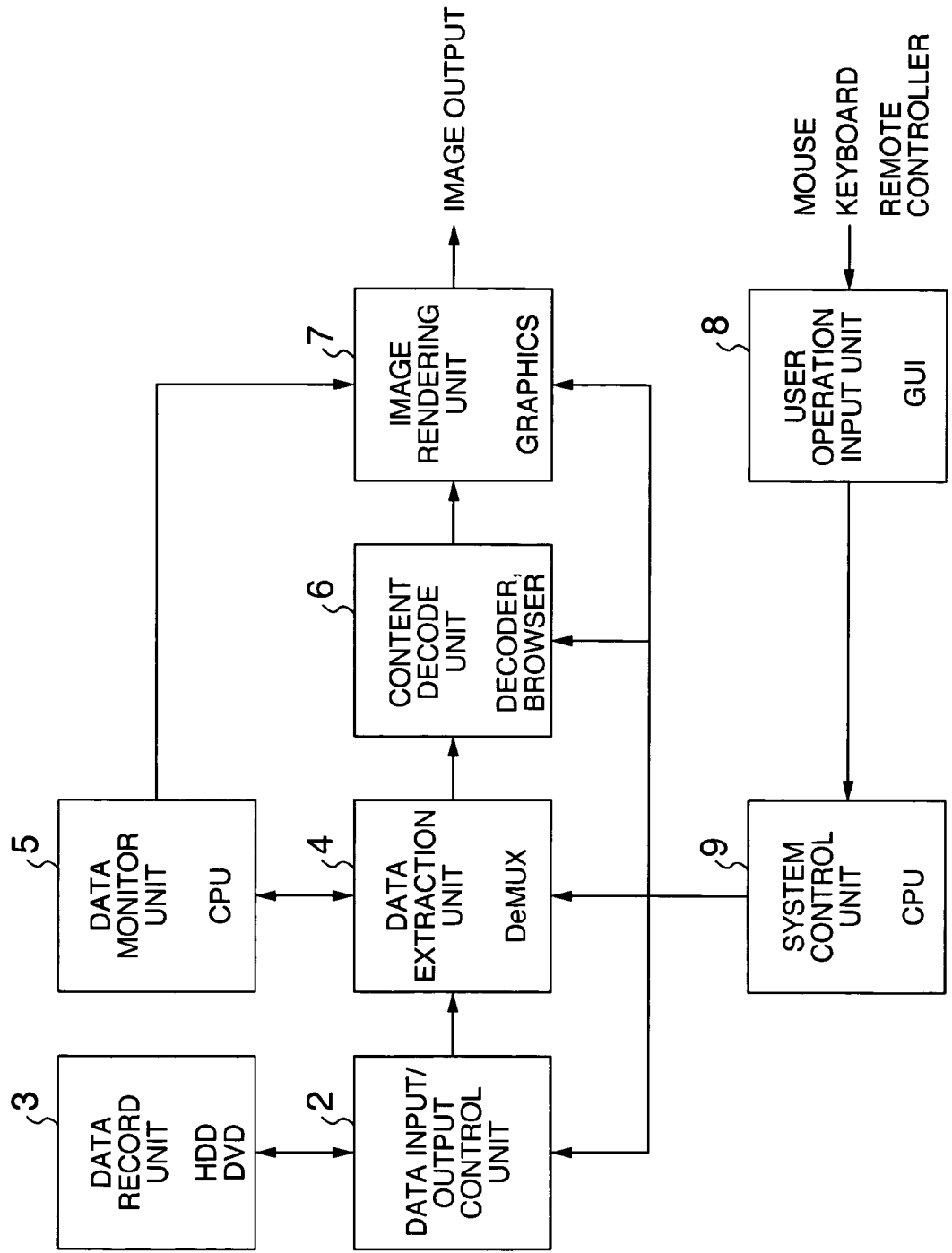
FIG. 7 is a diagram showing the structure of a digital content reproduction apparatus according to another embodiment of the present invention.

FIG. 7 is a diagram showing the structure of a digital content reproduction apparatus according to another embodiment of the present invention. Description will be made on only different points from the foregoing description.

In the foregoing description, although data acquired by using broadcasting waves is recorded in the data record unit 3, in this embodiment, the broadcast receiving unit 1 is not provided and only data recorded beforehand in the data record unit 3 is reproduced. This embodiment assumes an apparatus dedicated only to reproduction. The data input/output control unit 2 and other succeeding units are similar to those described above, and the description thereof is omitted.

Figure 8:
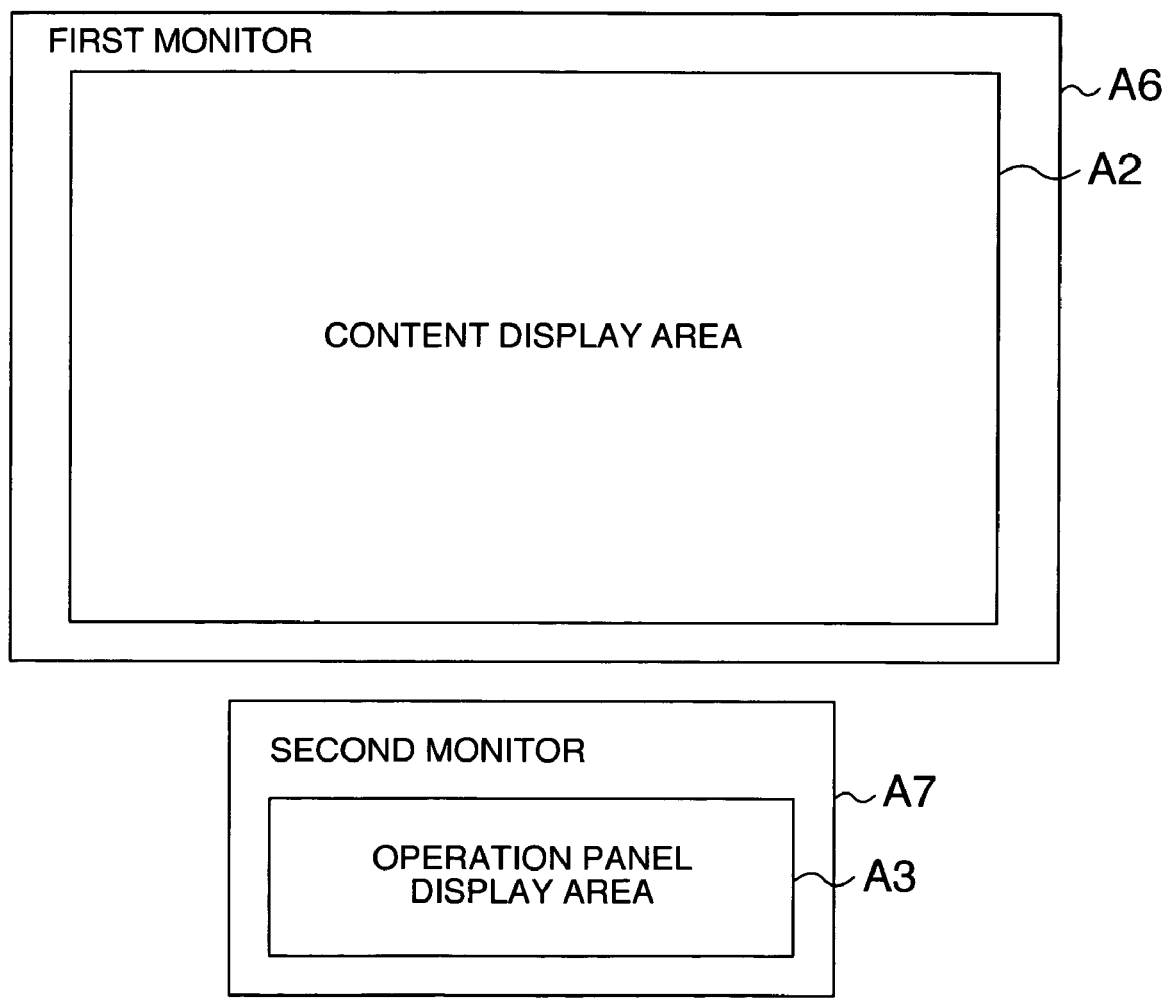
FIG. 8 is an illustrative diagram showing the layout of screens of the apparatus shown in FIG. 9.
Figure 9:
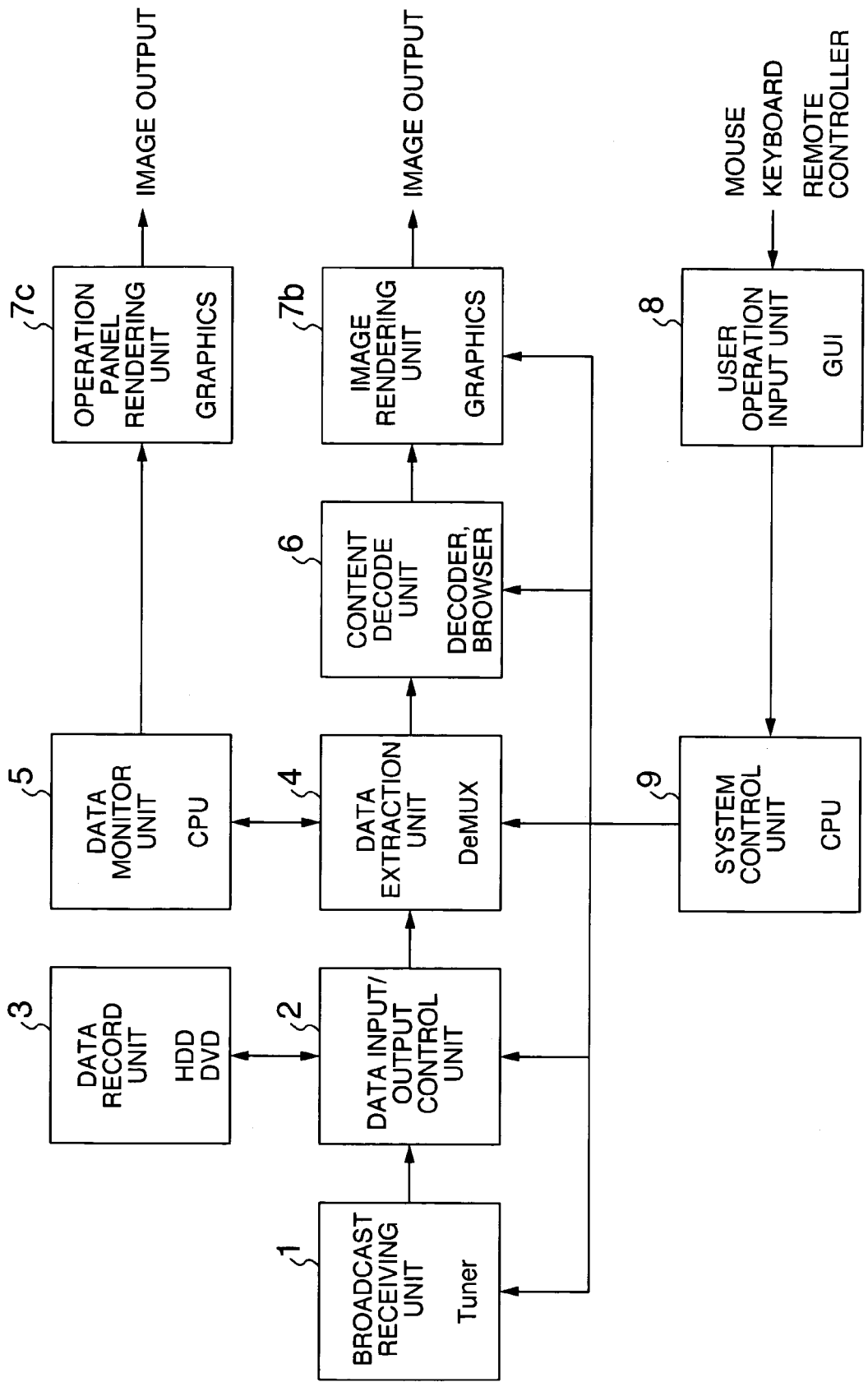
FIG. 9 is a diagram showing the structure of a digital content reproduction apparatus according to another embodiment of the present invention.

FIG. 8 is an illustrative diagram showing the layout of screens of the apparatus shown in FIG. 9. In the foregoing description, although a single monitor is used which has both the content display area and operation panel display area, in this embodiment, a first monitor A6 has a content display area A2 and a second monitor A7 has an operation panel display area A3. If a remote controller or the like has the operation panel display area A3, the number of keys of the remote controller can be reduced. FIG. 9 is a diagram showing the structure of the digital content reproduction apparatus of this embodiment.

Figure 10:
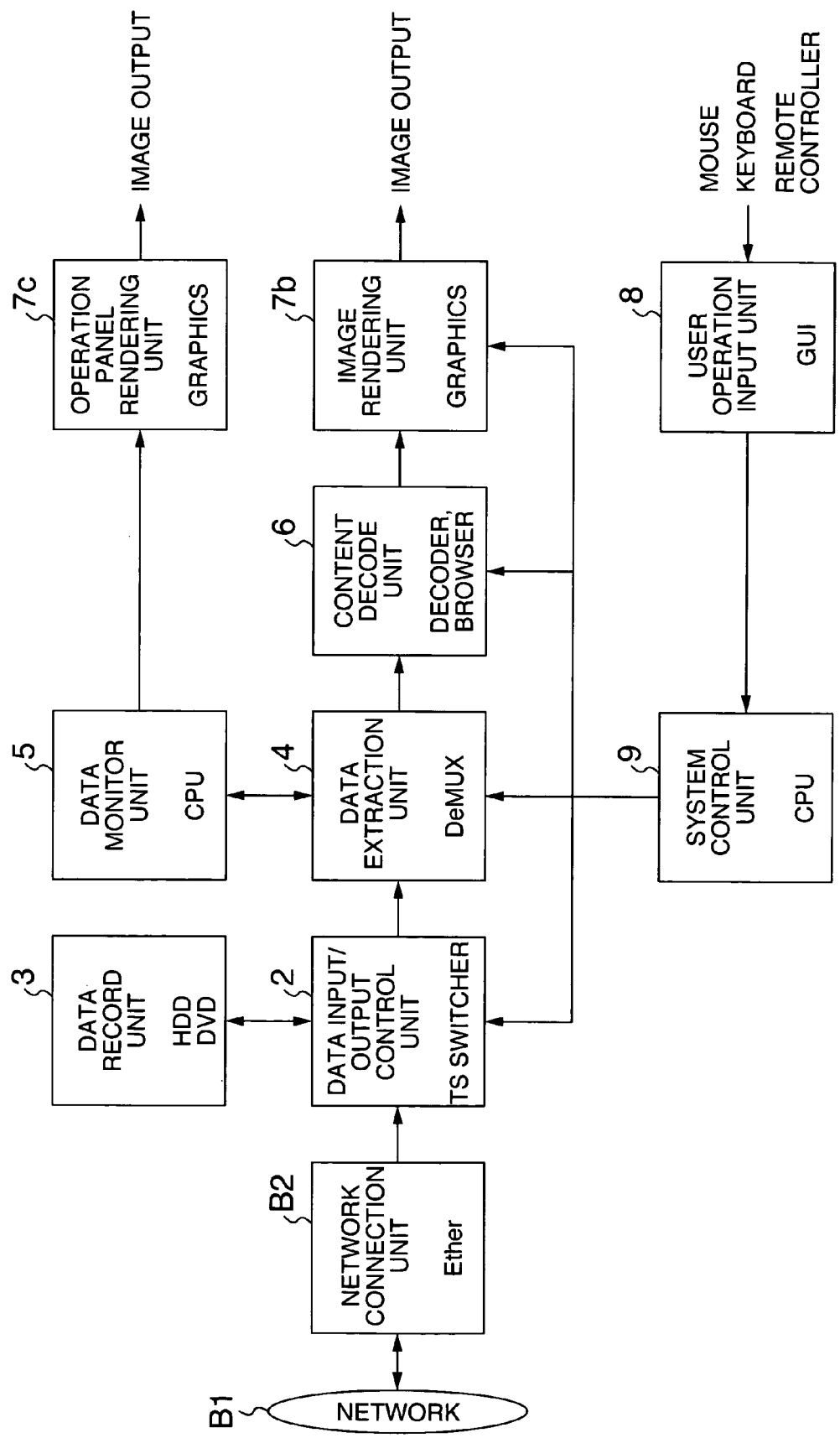
FIG. 10 is a diagram showing the structure of a digital content reproduction apparatus according to the embodiment of the present invention.
Figure 11:
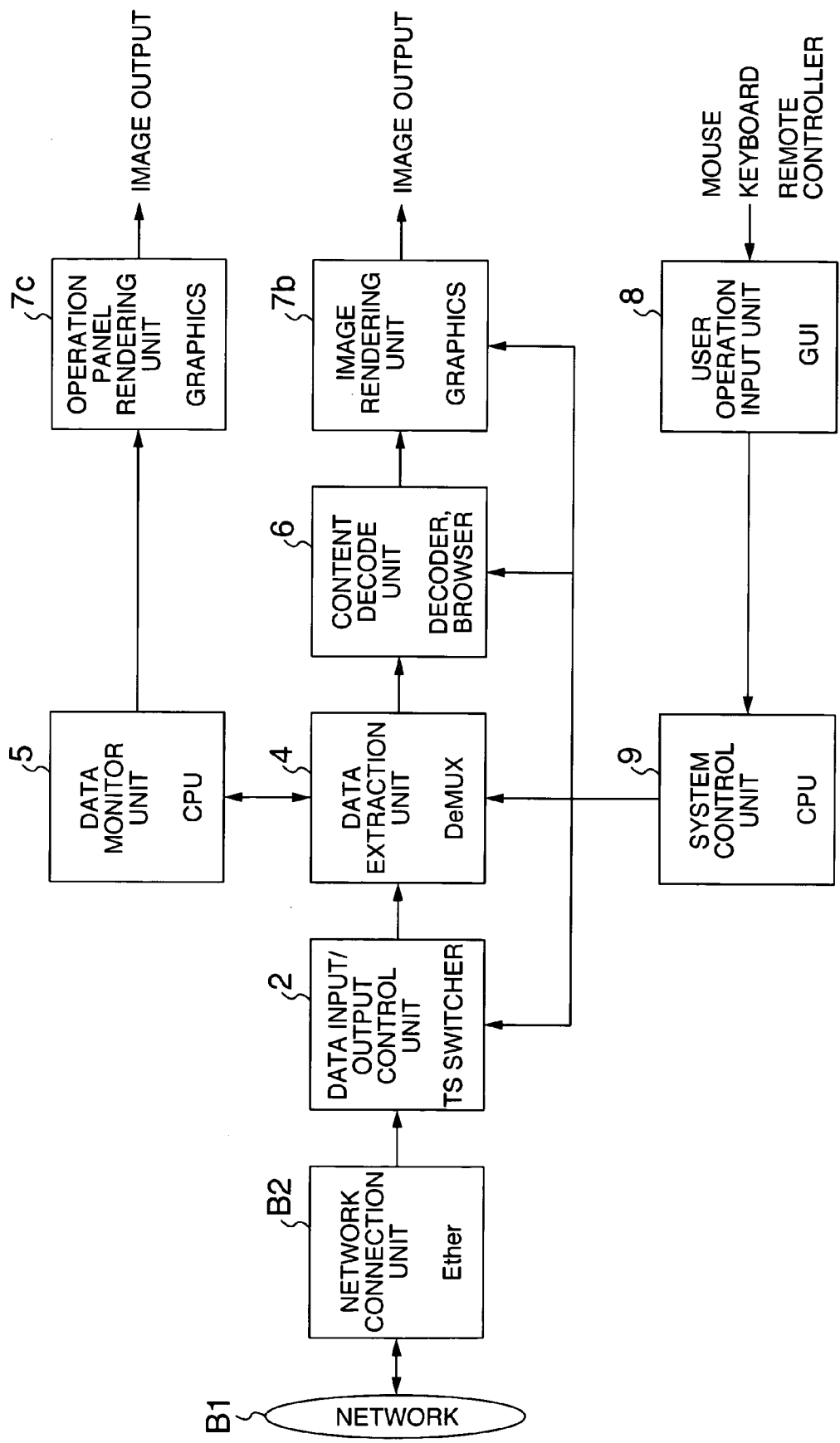
FIG. 11 is a diagram showing the structure of a digital content reproduction apparatus according to the embodiment of the present invention.
Figure 12:
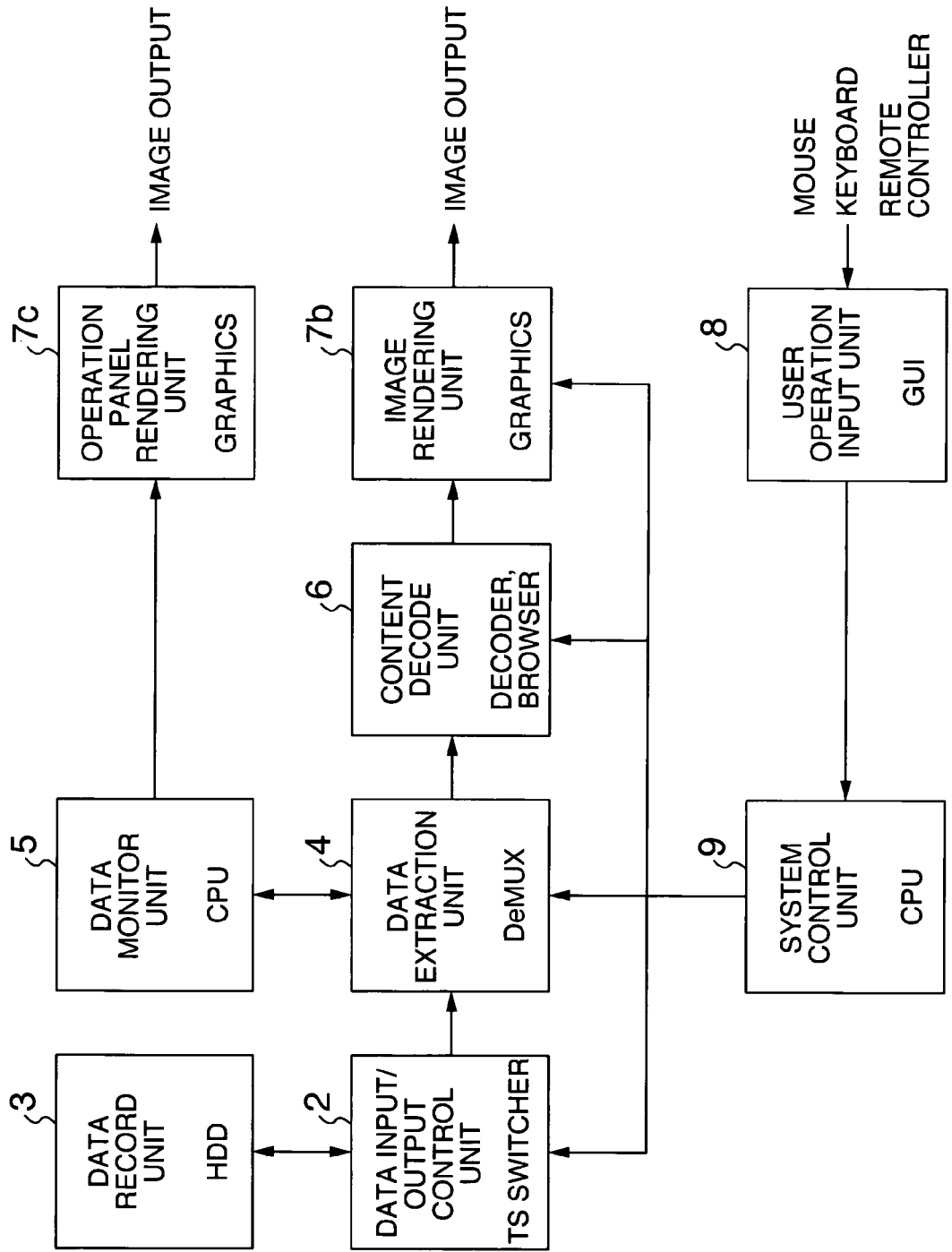
FIG. 12 is a diagram showing the structure of a digital content reproduction apparatus according to the embodiment of the present invention.

A different point from the foregoing description resides in that a content rendering unit 7b and an operation panel rendering unit 7c are independent. Other points are similar to the foregoing description, and the description thereof is omitted. FIGS. 10 to 12 show the structures that the content rendering unit 7b and operation panel rendering unit 7c are made independent as different from the foregoing description. Other points are similar to the foregoing description, and the description thereof is omitted.

FIGS. 10 to 12 are similar to those figures described above. In the foregoing description, although the data monitor unit monitors the auto_start_flag, in this embodiment, attributes of digital contents are recorded and a data broadcasting descriptive language BML (Broadcast Markup Language) is analyzed.

FIG. 13 shows examples of the attributes and language analysis results. Information on data added digital broadcasting includes up-to-date news, weather forecast and the like. These contents have a nature of an appreciation term and it is difficult to consider that these contents are referred to after, e.g., one month. In this embodiment, therefore, a content appreciation term is set beforehand in accordance with record days and times and information on the contents. If contents are within the appreciation term, data broadcasting is not displayed even if the auto_start_flag is "1", but the linear content operation panel is displayed. If the contents are within the appreciation term and a user does not still view the contents, the data broadcasting is automatically displayed even if the auto_start_flag is "0" and the interactive content operation panel is displayed. Only new information can be presented for viewing, by controlling the display state in accordance with information on digital contents.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A digital content reproducing apparatus, comprising:
a content input/output unit adapted to provide input/output control of digital contents;
a data monitor unit adapted to judge whether said digital contents are linear contents or interactive contents and to determine an appreciation term of said digital contents; and
an operation panel display unit adapted to display either a linear content operation panel or an interactive content operation panel in accordance with a judged and determined result by said data monitor unit;
wherein, when the data monitor unit judges the digital contents are linear contents and determines the digital contents are within the appreciation term, the operation panel display unit displays the interactive content operation panel,
when the data monitor unit judges the digital contents are linear contents and determines the digital contents are out of the appreciation term, the operation panel display unit displays the linear content operation panel,
wherein, when the data monitor unit judges the digital contents are interactive contents and determines the digital contents are within the appreciation term, the operation panel display unit displays the linear content operation panel, and
when the data monitor unit judges the digital contents are interactive contents and determines the digital contents are out of the appreciation term, the operation panel display unit displays the interactive content operation panel.

2. A digital content reproducing apparatus, comprising:
an input unit which inputs digital content;
a reproducer which reproduces the inputted digital content;
an output unit which outputs the reproduced digital content;
a display which displays the outputted digital content together with an alternative display of either of a linear content operation panel allowing user-instruction regarding linear reproduction functions of the reproduced digital content or an interactive content operation panel allowing user-instruction of interactive functions to an outside of the digital content reproducing apparatus, wherein the linear content operation panel and the interactive content operation panel are distinct panels from each other, which are not generated by a disabling of buttons; and
a controller which controls the alternative display of either of the linear content operation panel or the interactive content operation panel, wherein only one of the linear content operation panel or the interactive content operation panel is displayed exclusively at any given time, together with the outputted digital content:
wherein the outputted digital content together with either the linear content operation panel or the interactive content operation panel, are displayed concurrently in one screen.

3. The digital content reproducing apparatus according to claim 2, wherein the linear content operation panel and the interactive content operation panel are common in size, and are alternatively switched between each other in a same panel rendering area of the screen as alternative operation panels.

4. A digital content reproducing apparatus, comprising:
an input unit which inputs digital content;
a reproducer which reproduces the inputted digital content;
an output unit which outputs the reproduced digital content;
a display which displays the outputted digital content together with an alternative display of either of a linear content operation panel allowing user-instruction regarding linear reproduction functions of the reproduced digital content or an interactive content operation panel allowing user-instruction of interactive functions to an outside of the digital content reproducing apparatus, wherein buttons of the linear content operation panel are mutually different from buttons of the interactive content operation panel; and
a controller which controls the alternative display of either of the linear content operation panel or the interactive content operation panel, wherein only one of the linear content operation panel or the interactive content operation panel is displayed exclusively at any given time, together with the outputted digital content;

wherein the outputted digital content together with either the linear content operation panel or the interactive content operation panel, are displayed concurrently in one screen.

5. The digital content reproducing apparatus according to claim 4, wherein all the buttons are mutually different from each other.

6. The digital content reproducing apparatus according to claim 4, wherein the linear content operation panel and the interactive content operation panel are common in size, and are alternatively switched between each other in a same panel rendering area of the screen as alternative operation panels.

7. A digital content reproducing apparatus, comprising:
an input unit which inputs digital content;
a reproducer which reproduces the inputted digital content;
an output unit which outputs the reproduced digital content;
a display which displays the outputted digital content together with an alternative display of either of a linear content operation panel allowing user-instruction regarding linear reproduction functions of the reproduced digital content or an interactive content operation panel allowing user-instruction of interactive functions to an outside of the digital content reproducing apparatus, wherein buttons of the linear content operation panel producing mutually differing functions from functions of buttons of the interactive content operation panel; and a controller which controls the alternative display of either of the linear content operation panel or the interactive content operation panel, wherein only one of the linear content operation panel or the interactive content operation panel is displayed exclusively at any given time, together with the outputted digital content;

wherein the outputted digital content together with either the linear content operation panel or the interactive content operation panel, are displayed concurrently in one screen.

8. The digital content reproducing apparatus according to claim 7, wherein all the buttons of the linear content operation panel and the interactive content operation panel, provide mutually differing functions from each other.

9. The digital content reproducing apparatus according to claim 7, wherein the linear content operation panel and the interactive content operation panel are common in size, and are alternatively switched between each other in a same panel rendering area of the screen as alternative operation panels.

* * * * *